(12) United States Patent
Gariglio

(10) Patent No.: US 7,036,656 B2
(45) Date of Patent: May 2, 2006

(54) VACUUM BELT CONVEYOR FOR PLATES

(75) Inventor: Davide Gariglio, Piossasco (IT)

(73) Assignee: Forvet S.R.L., Volvera (IT)

( * ) Notice: Subject to any disclaimer, the term of this patent is extended or adjusted under 35 U.S.C. 154(b) by 0 days.

(21) Appl. No.: 10/850,006

(22) Filed: May 19, 2004

(65) Prior Publication Data

US 2005/0109588 A1   May 26, 2005

(30) Foreign Application Priority Data

Nov. 21, 2003  (IT) ................ TO2003A0927

(51) Int. Cl.
*B65G 13/02* (2006.01)
(52) U.S. Cl. ................ 198/689.1; 198/817; 198/449
(58) Field of Classification Search ............ 198/689.1, 198/817, 449, 498, 834, 604; 271/196, 197
See application file for complete search history.

(56) References Cited

U.S. PATENT DOCUMENTS

| | | | | |
|---|---|---|---|---|
| 3,389,908 A | | 6/1968 | Martin ................ 271/74 |
| 3,587,524 A | * | 6/1971 | Keating ............. 198/494 |
| 3,889,801 A | | 6/1975 | Boyer ................ 198/184 |
| 4,173,107 A | * | 11/1979 | Wilson ............... 53/534 |
| 4,327,542 A | * | 5/1982 | Van Ginhoven ....... 198/494 |
| 4,489,014 A | * | 12/1984 | Nagai et al. .......... 261/44.4 |
| 4,632,378 A | * | 12/1986 | Sardella ............. 198/689.1 |
| 4,861,232 A | * | 8/1989 | Ise et al. ............. 417/76 |
| 4,865,521 A | * | 9/1989 | Ise et al. ............ 417/187 |
| 5,051,145 A | * | 9/1991 | Lenhardt ............ 198/689.1 |
| 5,119,924 A | * | 6/1992 | Kaminski ............ 198/834 |
| 5,127,209 A | * | 7/1992 | Hunter ............... 53/439 |
| 5,622,362 A | * | 4/1997 | Shiiki et al. .......... 271/91 |
| 5,648,140 A | | 7/1997 | Vaders ............... 428/131 |
| 5,676,364 A | * | 10/1997 | Shiiki et al. .......... 271/91 |
| 5,807,065 A | * | 9/1998 | Kuhl ................ 414/796.7 |
| 5,849,142 A | * | 12/1998 | Fuehrer et al. ........ 156/556 |
| 5,884,873 A | * | 3/1999 | Breit ................ 244/209 |
| 6,216,848 B1 | | 4/2001 | Zens ................ 198/698.1 |
| 6,216,982 B1 | * | 4/2001 | Pfennig et al. ........ 244/130 |
| 6,367,228 B1 | * | 4/2002 | Wurst et al. .......... 53/381.4 |
| 6,621,014 B1 | * | 9/2003 | Tanner et al. ......... 177/121 |
| 2002/0129893 A1 | * | 9/2002 | Winter et al. ......... 156/283 |

FOREIGN PATENT DOCUMENTS

DE   100 08 831 A1   2/2000
GB   2 390 072 A     12/2003

* cited by examiner

*Primary Examiner*—Gene O. Crawford
*Assistant Examiner*—Rashmi Sharma
(74) *Attorney, Agent, or Firm*—David A. Farah; Sheldon & Mak PC

(57) ABSTRACT

A conveyor 1 for holding glass plates 2 in position during grinding and drilling operations comprising one or more than one belt 3, 3' 3" having a rotating surface and a suction generator 6 for generating a vacuum on the surface.

14 Claims, 5 Drawing Sheets

US 7,036,656 B2

VACUUM BELT CONVEYOR FOR PLATES

CROSS-REFERENCE TO RELATED APPLICATION

This application claims priority from Italian Patent Application TO2003A 000927 filed Nov. 21, 2003, the contents of which are incorporated by reference herein in their entirety.

BACKGROUND

During the manufacture of glass plates, unfinished glass plates are placed on a conveyor and moved through grinders and drills that remove excess glass to create the final shape of the glass plate. In general, the glass plates are held in position on the conveyor by friction between the plate and the surface of the conveyor, a surface that often comprises a special material for this purpose, such as rubber. Frequently, however, presses are also used to apply force to the side of the glass plates opposite the side resting on the conveyor, to secure the glass plate against the conveyors during grinding and drilling. Commonly used presses comprise a plurality of rollers having circumferential rubber rings or rubber tracks. Disadvantageously, however, rollers with rubber rings or rubber tracks frequently damage the surface of the glass plates because glass dust and glass chips from the grinding and drilling operations come to rest between the rollers and surface of the glass plates and abrade the glass surface when pressed on by the rollers. Further, many glass plates comprise a surface coating, such as a "LOW-E" ("low emission") coating, that can be damaged by the rollers.

Therefore, there is a need for a new conveyor for holding glass plates in position during grinding and drilling operations. Further, there is a need for a new method for holding glass plates in position during grinding and drilling operations.

SUMMARY

According to one embodiment of the present invention, there is provided a conveyor for holding glass plates in position during grinding and drilling operations. The conveyor comprises a) one or more than one belt having a rotating surface; and b) a suction generator for generating a vacuum on the surface. In one embodiment, the suction generator comprises a liquid loop pump or a multi-stage ejector pump. In another embodiment, the belt comprises one or more than one through-hole. In one embodiment, the conveyor further comprises a first support connected to the one or more than one belt. In another embodiment, the first support comprises one or more than one vacuum chamber. In one embodiment, the conveyor further comprises a guide positioned between the belt and the first support. In another embodiment, the guide is integral with the first support. In one embodiment, at least one of the one or more than one belt comprises one or more than one suction recess, and where the belt comprises one or more than one through-hole in each suction recess. In another embodiment, the first support comprises a plurality of vacuum chambers, and the guide comprises a plurality of openings corresponding to each one of the vacuum chambers. In one embodiment, the conveyor further comprises a cleaner for cleaning the one or more than one hole. In another embodiment, the cleaner comprises one or more than one wheel comprising a plurality of projecting pins configured to penetrate into the one or more than one hole. In one embodiment, the one or more than one belt comprises a plurality of belts attached to a second support comprising a translocator. In another embodiment, the one or more than one belt comprises a plurality of belts, and where at least one belt is fixed with respect to movement in a direction transverse to the direction of movement of the glass plate over the belt, and at least one belt that is movable with respect to the fixed belt in a transverse direction to the movement of the glass plate over the belt. In one embodiment, the translocator comprises an electro-cylinder or reducers.

According to another embodiment of the present invention, there is provided a conveyor system for holding glass plates in position during grinding and drilling operations comprising a plurality of conveyors according to the present invention. In one embodiment, where each of the pluralities of conveyors is capable of rotating at a rate that is independent of the rate of rotation of the other conveyors.

According to another embodiment of the present invention, there is provided a method for holding glass plates in position during grinding and drilling operations. The method comprises a) providing a conveyor according to the present invention; b) placing a glass plate on the conveyor; c) enabling the suction generator, thereby, holding the glass plate on the conveyor; d) operating on the glass plate; and e) disabling the vacuum, thereby releasing the glass plate from the conveyor.

According to another embodiment of the present invention, there is provided a method for holding glass plates in position during grinding and drilling operations. The method comprises a) providing a conveyor according to the present invention; b) moving one non-fixed belt closer to the fixed belt of the conveyor; c) placing a glass plate on the conveyor; d) enabling the suction generator, thereby, holding the glass plate on the conveyor; e) operating on the glass plate; and f) disabling the vacuum, thereby releasing the glass plate from the conveyor.

FIGURES

These and other features, aspects and advantages of the present invention will become better understood with regard to the following description, appended claims, and accompanying figures where:

DESCRIPTION

Figure 1:
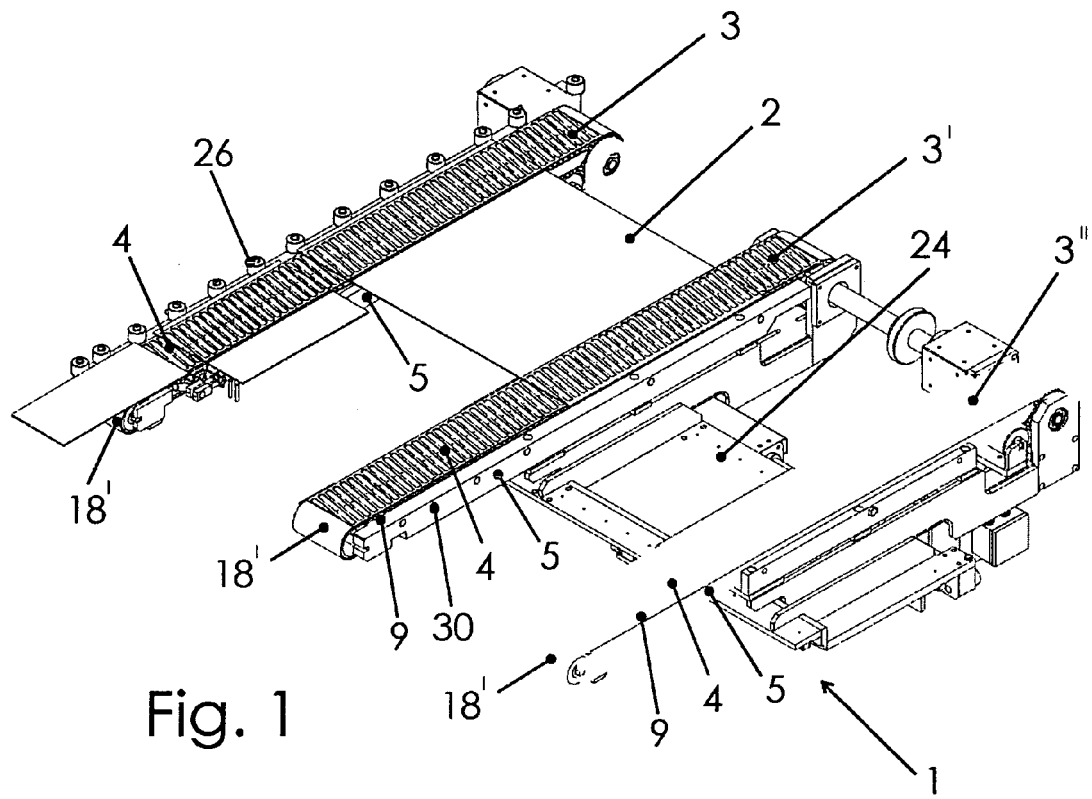
FIG. 1 is a top perspective view of one embodiment of a conveyor according to the present invention, with three belts in one position.

According to one embodiment of the present invention, there is provided a conveyor for holding glass plates in position during grinding and drilling operations. In one embodiment, the conveyor comprises a suction generator. According to another embodiment of the present invention, there is provided a device for holding glass plates in position during grinding and drilling operations. In one embodiment, the conveyor system comprises a one or more than one conveyor according to the present invention. In another embodiment, the conveyor system comprises a plurality of conveyors according to the present invention. According to another embodiment of the present invention, there is provided a method for holding glass plates in position during grinding and drilling operations. In one embodiment, the method comprises providing a conveyor according to the present invention. In another embodiment, the method comprises providing a conveyor system according to the present invention. The conveyor, conveyor system and method of the present invention will now be disclosed in detail.

All dimensions specified in this disclosure are by way of example only and are not intended to be limiting. Further, the proportions shown in these Figures are not necessarily to scale. As will be understood by those with skill in the art with reference to this disclosure, the actual dimensions of any device or part of a device disclosed in this disclosure will be determined by its intended use.

As used in this disclosure, the terms "vacuum" and "suction" are interchangeable. The terms "vacuum" and "suction" are not intended to be limited to mean only a perfect vacuum but are intended to mean also a relative vacuum with respect to the ambient pressure.

Though the conveyor, conveyor system and method are disclosed with reference to glass plates, it should be understood that any other suitable non-glass material, substance or composite can also be used with the conveyor, conveyor system and method of the present invention. Therefore, the term "glass plate(s)" should be construed to include all such non-glass material, substances and composites, such as plastic and wood. Further, though the conveyor, conveyor system and method are disclosed with reference to grinding and drilling operations, it should be understood that any other suitable operation, such as shaving and cutting, can be performed using the conveyor, conveyor system and method of the present invention. Therefore, the term "grinding and drilling" and related phrases, should be construed to include all such other operations.

According to one embodiment of the present invention, there is provided a conveyor for holding glass plates in position during grinding and drilling operations. Referring now to FIGS. 1–12, there is shown a conveyor 1 for holding glass plates in position during grinding and drilling operations according to the present invention. Glass plates of varying sizes, shapes and thickness, such as the glass plate 2 shown in the figures, are transported on the conveyor 1 during grinding and drilling operations.

The conveyor 1 comprises one or more than one belt 3 having a rotating surface and, connected to the belt 3, a suction generator 6 for generating a vacuum on the surface. The suction created by the suction generator 6 is used to apply suction to the surface of the glass plate 2 in contact with the conveyor 1, thereby keeping the glass plate 2 in contact with the conveyor 1 during grinding and drilling operations. The suction generator 6 creates suction using known technology, as will be understood by one of ordinary skill in the art with reference to this disclosure, such as a liquid loop pump or a multi-stage ejector pump. Incorporating the suction generator 6 into the conveyor 1 of the present invention eliminates the need for rollers to hold the glass plates in position, and thereby, prevents surface damage to the glass plates associated with the rollers. Further, the conveyor of the present invention exerts a holding force on the glass plate that is at least as great as the holding force of conveyors that use rollers without the disadvantages of the rollers. Additionally, the suction generator 6 can reach efficiencies that are equal to 80% or more even though the components of the conveyor 1 are not interconnected with tight seals; however, even an efficiency as low as 40% is enough to generate a sufficient holding force on the glass plate for grinding and drilling operations. Therefore, suction can be applied to the glass plate 2 through only part of the conveyor 1 while transporting the glass plate 2, and the glass plate 2 will still be held in position even though there will be leakage of the vacuum from part of the conveyor 1 where the glass plate 2 has already passed or has not yet reached.

Referring again to the Figures, there are shown various preferred embodiments of the conveyor 1 and parts of the conveyor 1 according to the present invention. As can be seen, in these embodiments, the conveyor 1 comprises one or more than one belt 3 (3', 3") comprising one or more than one through-hole 4'. The conveyor 1 further comprises a first support 5 connected to the one or more than one belt 3 (3', 3") for supporting the one or more than one belt 3 (3', 3"). The first support 5 comprises one or more than one vacuum chamber 7. The conveyor 1 further comprises a guide 9 for the one or more than one belt 3 (3', 3"), where the guide 9 is positioned between the belt 3 (3', 3") and the first support 5 in order to seal the one or more than one vacuum chamber 7. The guide 9 is equipped with one or more than one opening 11 through which the vacuum chamber 7 communicates externally and attracts the glass plate 2 onto the conveyor 1.

Figure 5:
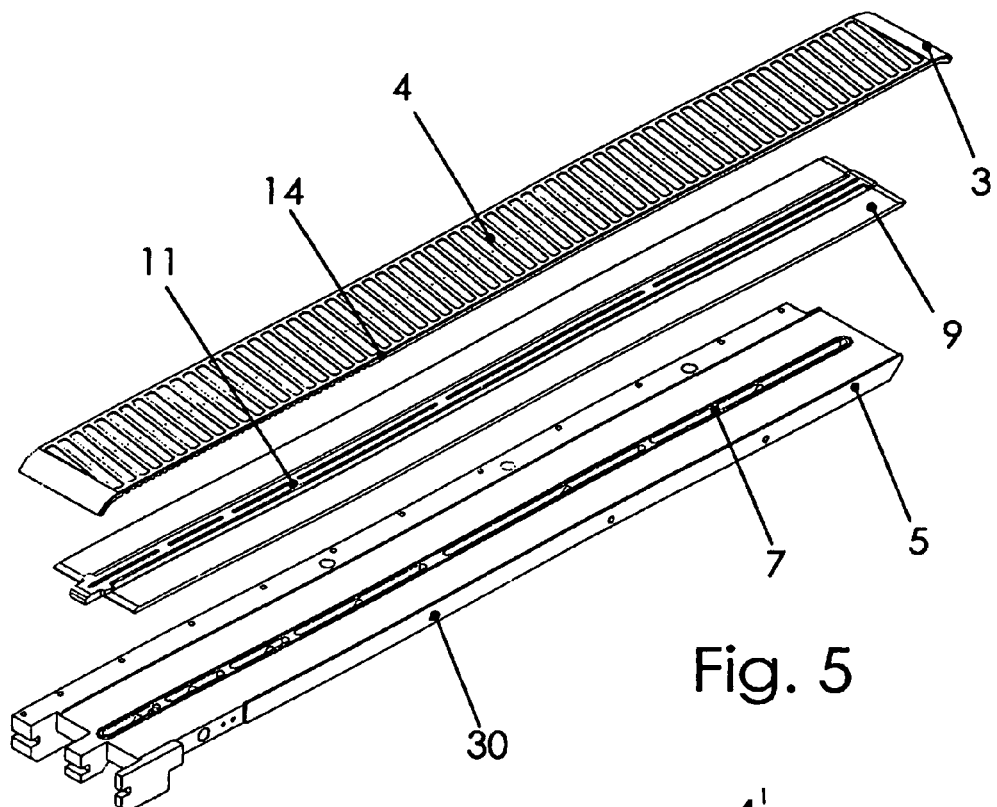
FIG. 5 is an exploded perspective view of three components of a conveyor according to the present invention.
Figure 6:
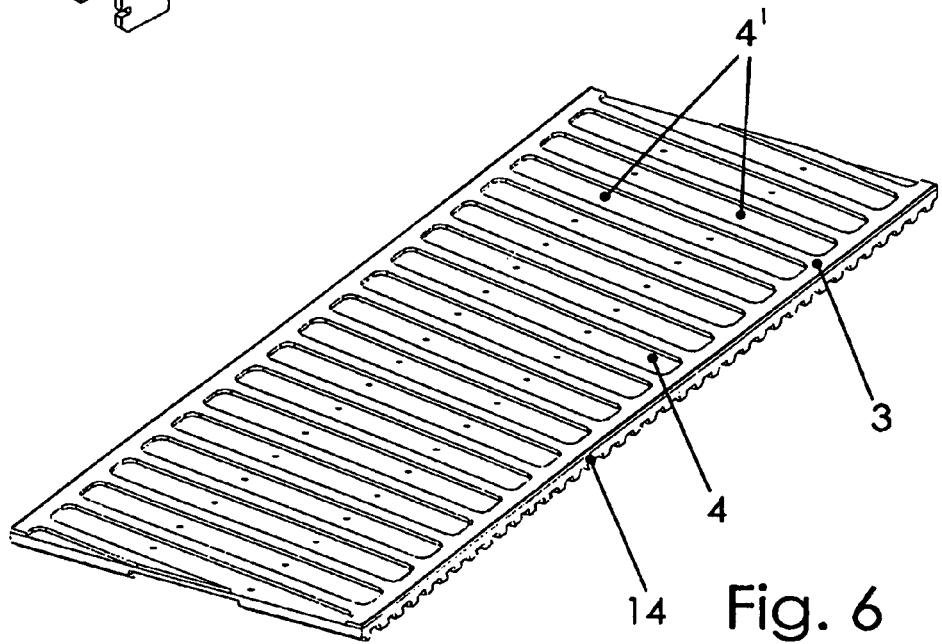
FIG. 6 is a partial top perspective view of a conveyor according to the present invention.
Figure 7:
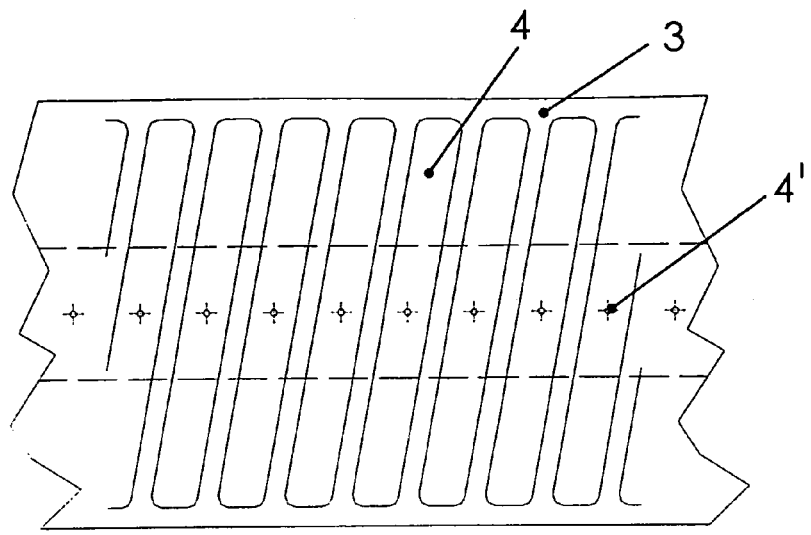
FIG. 7 is an enlarged, partial top view of the conveyor shown in FIG. 6.
Figure 8:
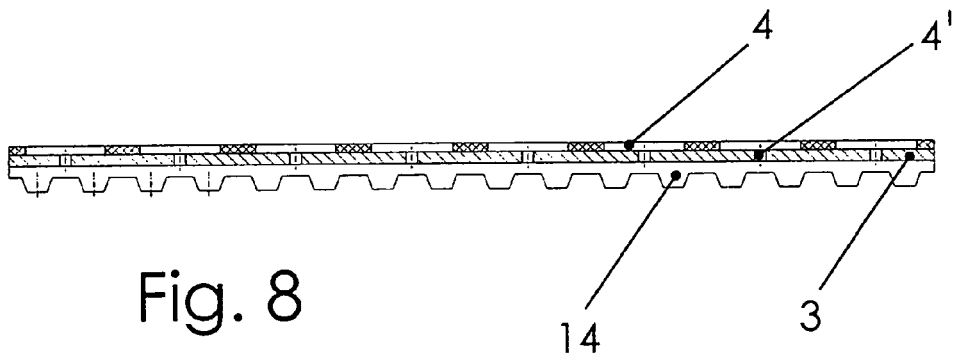
FIG. 8 is a cross-sectional, lateral perspective view of the conveyor shown in FIG. 6.
Figure 9:
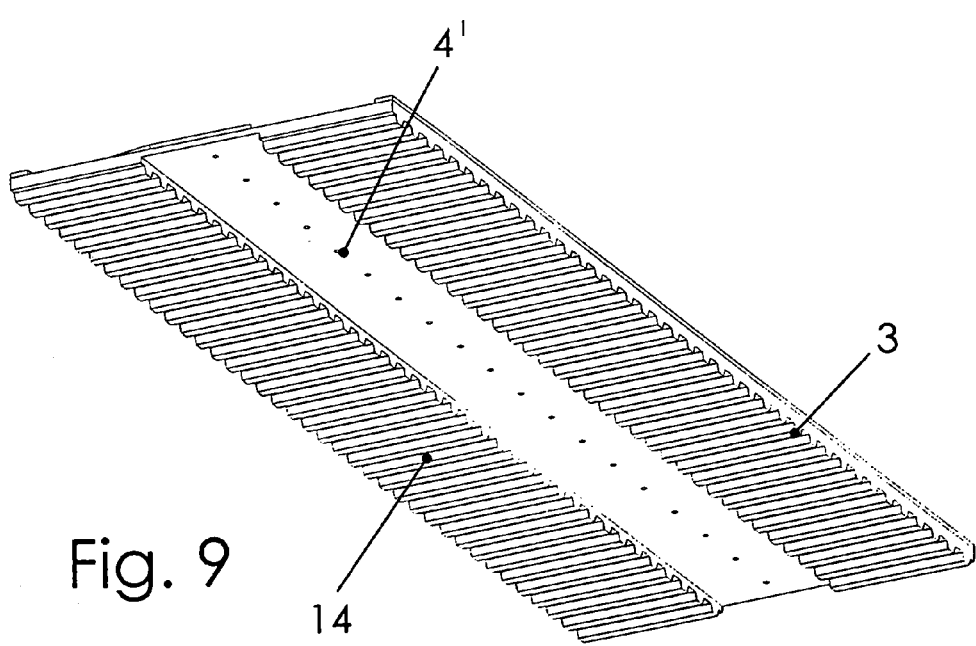
FIG. 9 is a partial bottom perspective view of the conveyor shown in FIG. 6.
Figure 10:
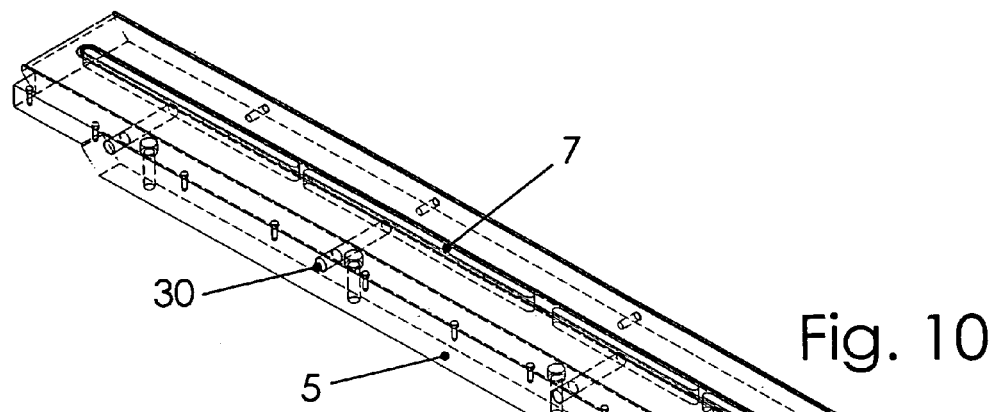
FIG. 10 is a perspective view showing the inside of the first support of the conveyor shown in FIG. 5.
Figure 11:
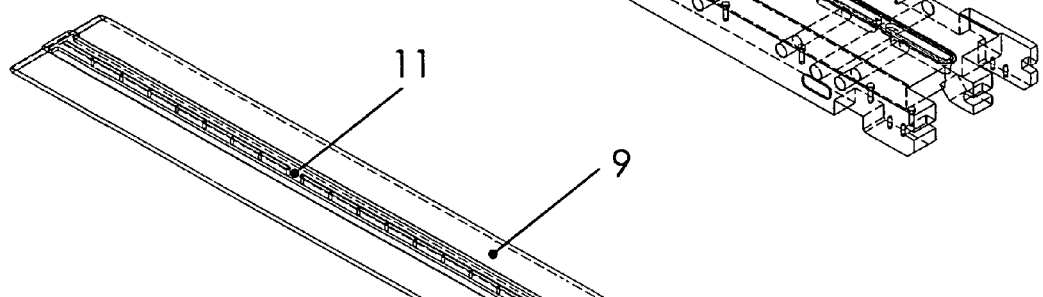
FIG. 11 is a perspective view that shows the inside of the guide of the conveyor shown in FIG. 5.

As can be seen in FIG. 5, the guide 9 can be made separately from the first support 5, and then joined to the first support 5. Alternately, the guide 9 can be produced integrally with the first support 5.

As can be seen in the preferred embodiment shown particularly in FIG. 5–8, each belt 3 (3', 3") comprises one or more than one suction recess 4, preferably with its long axis oriented obliquely to the direction of movement of the glass plate 2, and having the one or more than one through-hole 4' in each suction recess 4. This embodiment is preferred because each suction recess 4 creates a suction chamber that acts separately on the glass plate 2 as the glass plate 2 covers the suction recess during movement over the suction recess 4. Further, the suction in each suction recess 4 can be separately controlled from the suction in the other suction recesses, such as for example, progressively removing the vacuum from each suction recess 4 by using an encoder, for example, that detects movement of the glass plate 2 over the suction recess 4. In the embodiment shown in FIG. 6 and FIG. 7, each suction recess 4 is oriented obliquely to the direction of movement of the glass plate 2 and to the longitudinal axis of the belt 3 in order to facilitate holding the glass plate 2 on the conveyor 1 while reducing wear of the conveyor 1. In this embodiment, it is preferred that the first support 5 comprise a plurality of vacuum chambers 7, and the guide 9 comprise a plurality of respective openings 11 corresponding to each one of the vacuum chambers 7. The vacuum chambers 7, supplied by corresponding holes 30, are connected to the upstream and downstream vacuum circuit, allowing them to be progressively activated and deactivated by applying and removing the vacuum according to the movement advancement of the plates 2 over the vacuum chambers 7. In a preferred embodiment, the vacuum circuit is preferably driven by a solenoid valve (not shown), as will be understood by those with skill in the art with reference to this disclosure, that activates the suction, and every chamber 7 is equipped with a membrane valve, as will be understood by those with skill in the art with reference to this disclosure, and driven by another solenoid valve in order to create or remove suction from the chamber 7.

In a preferred embodiment, the belt 3 (3', 3") comprises a plurality of teeth 14 adapted to engage respective grooves 16 of the wheels 18 for moving the conveyor 1 around the wheels 18 and corresponding rollers 18' that rotate freely, that is that rotate without being driven by a motor.

Figure 12:
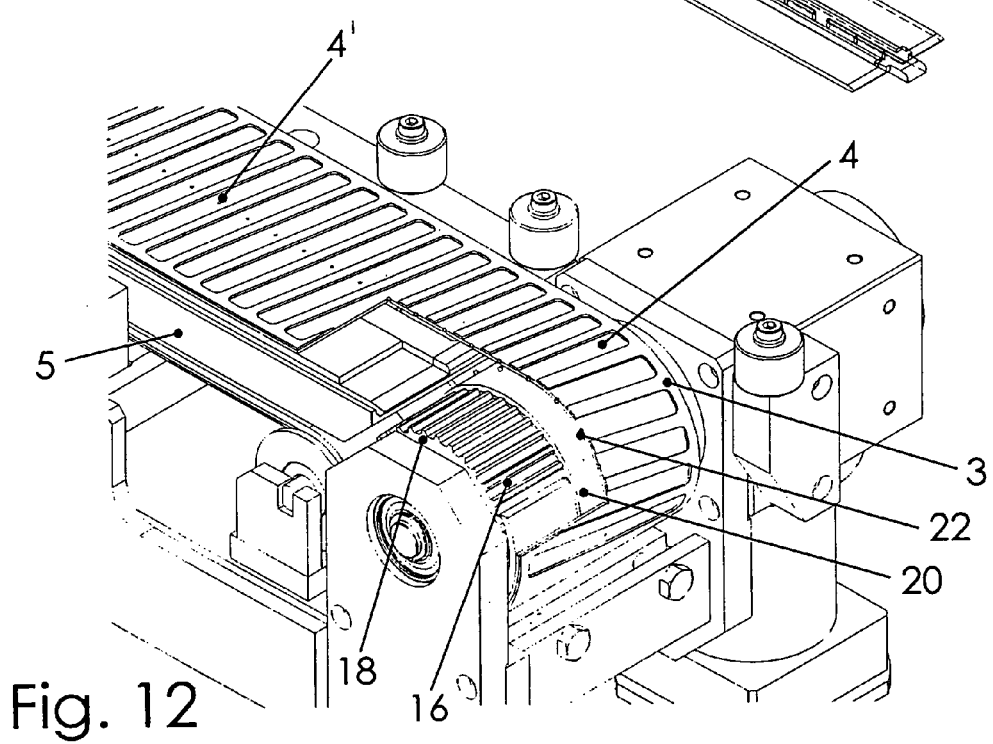
FIG. 12 is a partial, front perspective view of a conveyor according to the present invention.

During use, glass dust and debris will tend to clog the holes 4'. Therefore, in another preferred embodiment, the conveyor 1 comprises a cleaner for the holes, such as one or more than one wheel 20, as best shown in FIG. 12, where the wheel 20 comprises a plurality of projecting pins 22 configured to penetrate into the respective holes 4' of the belt 3 (3', 3") to remove any dust and debris from the holes 4' during each complete rotation of the belt 3 (3', 3").

In a particularly preferred embodiment, the conveyor of the present invention comprises a plurality of belts capable of being coupled in various configurations to permit grinding and drilling operations on glass plates of different sizes and shapes, including simultaneous operations on different glass plates on the same line. In one embodiment, the conveyor comprises two belts. In another embodiment, the conveyor comprises three belts.

Referring now to FIGS. 1–4, there is shown one embodiment of the conveyor 1 according to the present invention comprising three interconnected belts 3, 3', 3" The three belts comprise at least one belt that is fixed with respect to movement in a direction transverse to the direction of movement of the glass plate over the belt, and at least one belt that is movable with respect to the fixed belt in a transverse direction to the movement of the glass plate. As shown in FIGS. 1–4, the first belt 3 is fixed and is equipped with a plurality of bearing and working-reference rollers 26, while the second and third belts 3', 3" are moveable with respect to the fixed belt 3 transverse to the direction of movement of the glass plate over the belts through the movement of a second support 24 to which they are attached. The distance between the belts 3, 3' and 3" is varied by operating the second support 24, such as through translocator 28 shown best in FIGS. 2 and 4. In a preferred embodiment, the translocator 28 comprises an electro-cylinder or suitable reducers, as will be appreciated by one of ordinary skill in the art with reference to this disclosure.

By moving the belts 3' and 3" transversely to the direction of movement of the glass plate over the belts, the conveyor 1 can support and hold glass plates of varying transverse dimensions. Additionally, a vacuum can be applied to the glass plate through the two movable belts 3', 3" after they are positioned with respect to the fixed belt 3, either simultaneously or alternatively to the vacuum applied to the glass plate 2 through the belt 3, thereby providing a greater or lesser holding force on the plate 2.

Figure 2:
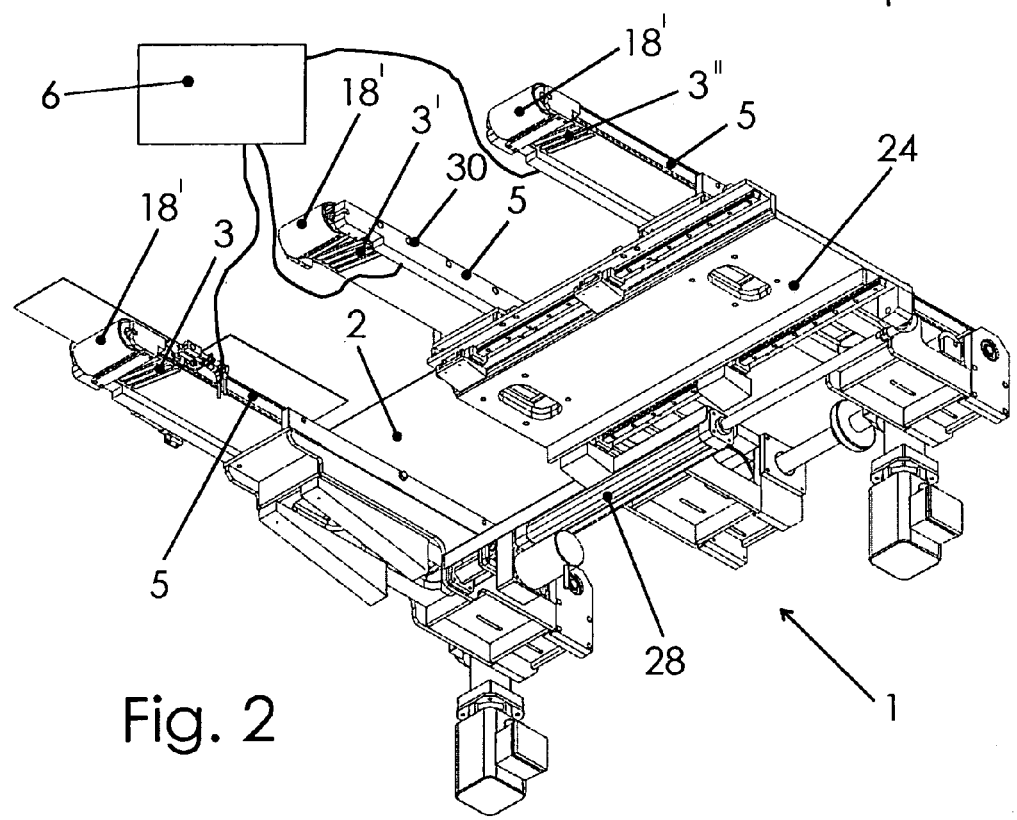
FIG. 2 is a bottom perspective view of the conveyor shown in FIG. 1.
Figure 3:
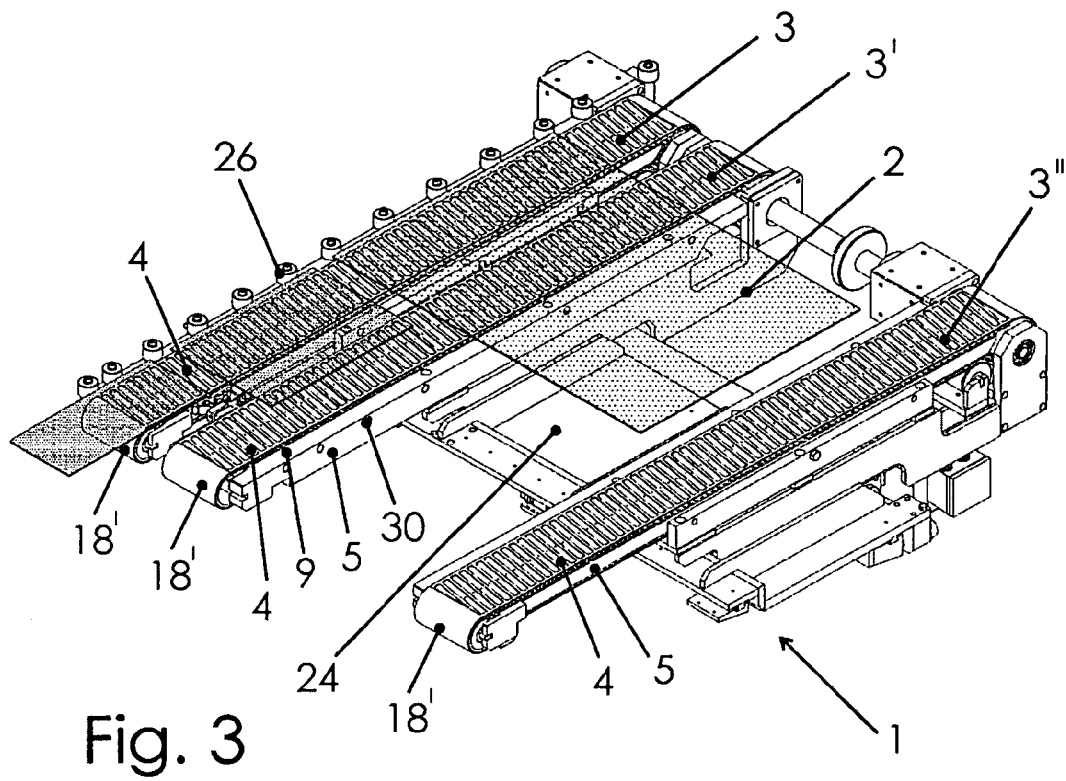
FIG. 3 is a top perspective view of the conveyor shown in FIG. 1, with three belts in a different position.
Figure 4:
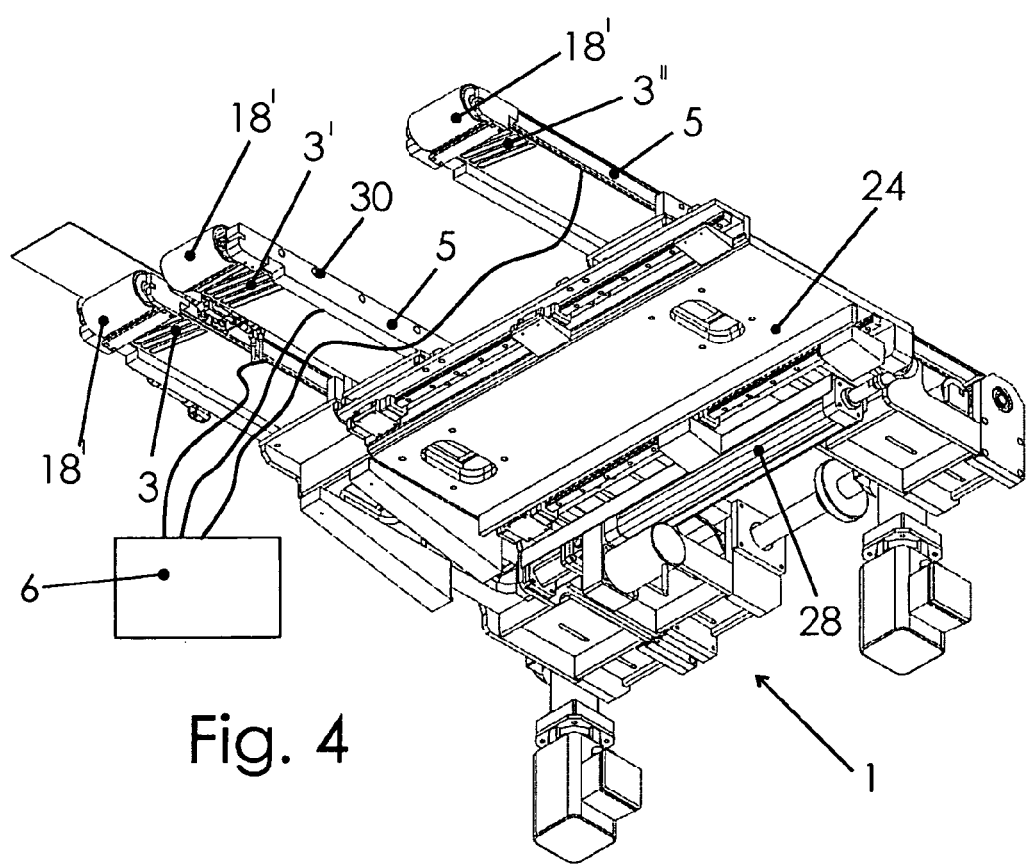
FIG. 4 is a bottom perspective view of the conveyor shown in FIG. 3.

FIGS. 1 and 2 show the conveyor 1 of the present invention with the belts 3, 3' and 3" in an "open" position, where the moveable belt 3' is separated from the fixed belt 3 to accommodate a glass plate 2 having a relatively large transverse dimension. FIGS. 3 and 4 show the conveyor 1 of the present invention with the belts 3, 3' and 3" in a "closed" position, where the moveable belt 3' is adjacent to the fixed belt 3 to accommodate a glass plate 2 having a smaller transverse dimension. As will be appreciated by one of ordinary skill in the art with reference to this disclosure, a single belt can be used to hold glass plates having a small transverse dimension, however, it is preferred that at least two belts engage each glass plate during grinding and drilling operations.

According to another embodiment of the present invention, there is provided a conveyor system for holding glass plates in position during grinding and drilling operations. In one embodiment, the conveyor system comprises a plurality of conveyors according to the present invention. In a preferred embodiment, each plurality of conveyors is capable of rotating at a rate that is independent of the rate of rotation of the other conveyors, thereby allowing for simultaneous or non-simultaneous grinding and drilling of glass plates having different sizes and shapes.

According to another embodiment of the present invention, there is provided a method for holding glass plates in position during grinding and drilling operations. In one embodiment, the method comprises providing a conveyor according to the present invention, placing a glass plate on the conveyor, enabling the suction generator, thereby, holding the glass plate on the conveyor, operating on the glass plate, such as grinding or drilling the glass plate, and disabling the suction generator, thereby releasing the glass plate from the conveyor. In another embodiment, the method comprises moving one non-fixed belt closer to the fixed belt of the conveyor before enabling the vacuum. In another embodiment, the method comprises moving one non-fixed belt further from the fixed belt of the conveyor before enabling the vacuum.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A conveyor for holding glass plates in position during grinding and drilling operations comprising:
a) a first belt having a longitudinal first axis and having a first surface for rotating in a first direction;
b) a suction generator for generating a vacuum on the first surface; and
c) a first support connected to the first belt, the first support comprising one or more than one vacuum chamber;
where the first belt comprises a plurality of suction recesses with a long axis oriented obliquely to the longitudinal first axis of the first belt; and
where the first belt comprises one or more than one through-hole in each suction recess.

2. The conveyor of claim 1, where the suction generator comprises a liquid loop pump or a multi-stage ejector pump.

3. The conveyor of claim 1, where the first support comprises a plurality of vacuum chambers.

4. The conveyor of claim 1, further comprising a cleaner for cleaning the one or more than one hole.

5. The conveyor of claim 4, where the cleaner comprises one or more than one wheel comprising a plurality of projecting pins configured to penetrate into the one or more than one hole.

6. The conveyor of claim 1, further comprising a second belt attached to a second support comprising a translocator, where the translocator moves the second belt in a second direction transverse to the first direction.

7. The conveyor of claim 6, where the translocator comprises an electro-cylinder or reducers.

8. A conveyor system for holding glass plates in position during grinding and drilling operations comprising a plurality of conveyors according to claim 1.

9. The conveyor system of claim 8, where each of the pluralities of conveyors is capable of rotating at a rate that is independent of the rate of rotation of the other conveyors.

10. A method for holding glass plates in position during grinding and drilling operations comprising:
 a) providing a conveyor according to claim 1;
 b) placing a glass plate on the conveyor;
 c) enabling the suction generator, thereby, holding the glass plate on the conveyor;
 d) operating on the glass plate; and
 e) disabling the vacuum, thereby releasing the glass plate from the conveyor.

11. A method for holding glass plates in position during grinding and drilling operations comprising:
 a) providing a conveyor according to claim 6;
 b) moving the second belt in a second direction transverse to the first direction;
 c) placing a glass plate on the conveyor;
 d) enabling the suction generator, thereby, holding the glass plate on the conveyor;
 e) operating on the glass plate; and
 f) disabling the vacuum, thereby releasing the glass plate from the conveyor.

12. The conveyor of claim 3, further comprising a guide positioned between the first belt and the first support, where the guide comprises a plurality of openings corresponding to each one of the vacuum chambers.

13. The conveyor of claim 1, further comprising a guide positioned between the first belt and the first support.

14. The conveyor of claim 12, where the guide is integral with the first support.

* * * * *